Feb. 13, 1951 J. W. GUZEL 2,541,511
REMOVABLE HANDLE
Filed Sept. 29, 1948
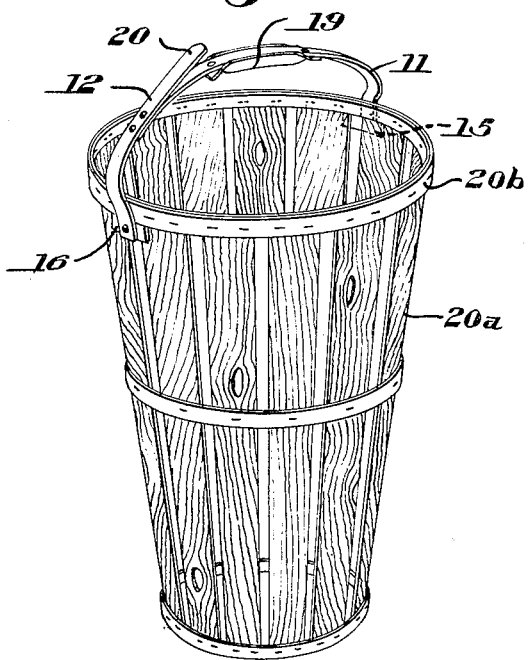
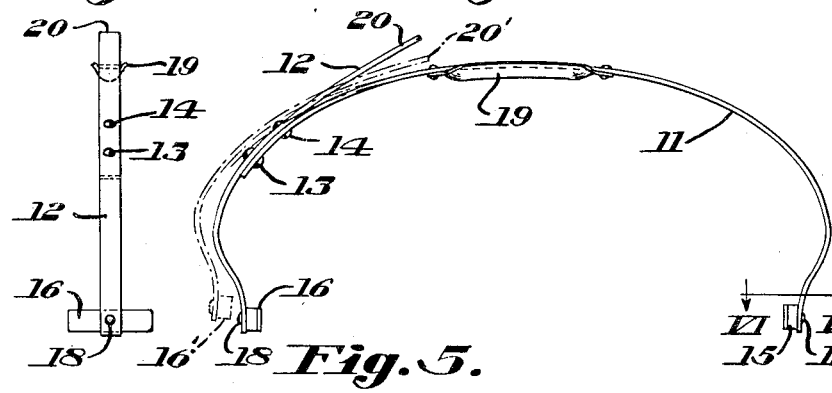
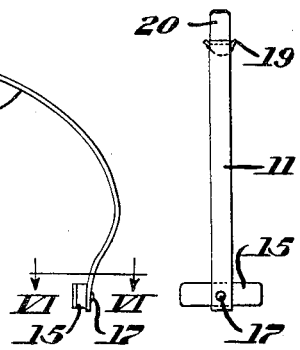
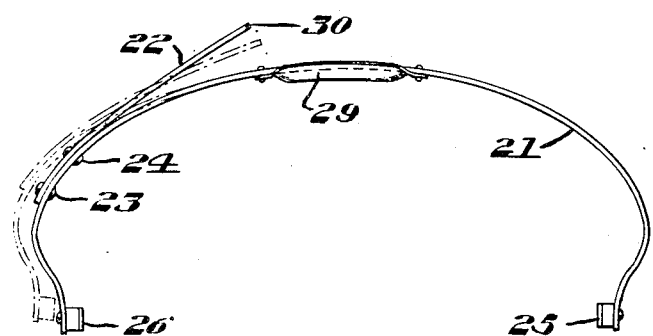
INVENTOR
JOHN W. GUZEL Patented Feb. 13, 1951

2,541,511

UNITED STATES PATENT OFFICE 2,541,511

REMOVABLE HANDLE

John W. Guzel, Cuddy, Pa.

Application September 29, 1948, Serial No. 51,811

2 Claims. (Cl. 224—45)

The removable handle of my invention is intended for use on containers, particularly flanged containers such as vegetable baskets, and is adapted to be placed thereon and removed therefrom with speed and facility. Removable handles have been used in the past on flanged containers, but these handles had the disadvantage that they could not be readily flexed open and shut without the use of both hands of the operator or without pressing them sidewise against the container. My handle has the advantage that it may be readily opened and closed by the hand which grasps it, merely by thumb pressure on a projection adjacent the portion of the handle grasped by the hand.

My handle securely engages the flange of the container on which the handle is placed, and if my handle is left on a container, it will grip the sides of the container and not fall off.

My handle is of strong, durable and simple construction and may readily be fabricated and assembled.

In the accompanying drawings I have illustrated certain present preferred embodiments of my invention in which, Figure 1 is an isometric view of a form of my handle mounted on a basket;

Figure 2 is a side view of the handle shown in Figure 1;

Figures 3 and 4 are end views from the left and right respectively of the handle shown in Figure 2;

Figure 5 is a side view of another form of my handle; and

Figure 6 is a sectional view on the line VI—VI in Figure 2.

One form of handle constructed in accordance with my invention is shown in Figures 1–4 and comprises an arched structure made up of a resilient steel element 11 and a stiff and relatively inflexible steel element 12. The element 11 extends in a curve toward and tangentially against an intermediate portion of the element 12, where the two elements are fastened rigidly together by bolts 13 and 14, and one end of the element 12 continues the curve to complete the arched structure. Flange engaging grippers are fastened at the ends of the arched structure, a gripper 15 being rigidly secured to the element 11 by a rivet 17 and a gripper 16 being rigidly secured to the element 12 by a rivet 18. The heads of the rivets 17 and 18 adjacent the grippers 15 and 16 are flattened to permit the grippers to lie closely against the sides of a container. The grippers 15 and 16 are formed of short, flat lengths of steel and are curved concavely toward each other (as shown in Figure 6) on a radius equal approximately to half the distance between said grippers.

A handle attachment 19 is fastened to the element 11 at the center of the arched structure to provide a convenient place to grasp the handle.

An end of the element 12 extends tangentially from the element 11 to form a projection 20 above and adjacent to the handle attachment 19, as shown in Figure 2. The purpose of this projection 20 is to provide a convenient means for controlling the distance between the grippers 15 and 16. The projection 20 may readily be pressed down by the thumb of a hand gripping the handle attachment 19, and as the projection 20 is pressed down, the flexible element 12 does not bend to any appreciable extent but the resilient element 11 is caused to bend between the bolt 14 and the handle 19 (see Figure 2). As a result, when the projection 20 reaches the position 20' shown in Figure 2, the gripper 16 is moved away from the gripper 15 to the position 16' (assuming the handle attachment 19 to remain stationary), thereby opening the handle. The resilient element 11 will cause the handle to close again when pressure on the projection 20 is released. In this way the handle may readily be opened and closed in order to engage and disengage the flange of a container when the handle is being placed on or removed from a container.

The handle may be placed on a container 20a having a flange 20b as illustrated in Figure 1, with the grippers 15 and 16 positioned on opposite sides of the container under the flange 20b. The distance between the grippers 15 and 16 is predetermined for the size of container on which the handle is to be used, so that resilient element 11 will cause the grippers 15 and 16 to press yieldably against opposite sides of the container. In this way the handle will hold itself in place on the container when the handle is released and is not held in place by hand. If the handle should be placed on a container having a flange thicker than the grippers 15 and 16, the portion of the elements 15 and 16 immediately above the grippers 15 and 16 would yieldably press against opposite sides of the flange to hold the handle in place, or the grippers 15 and 16 could be bent so that their ends would engage the sides of the container and hold the handle in place. The grippers 15 and 16 bear against the flange 20b to hold the handle upright while the handle is holding itself in place on the container. When the attachment 19 is grasped by hand and the handle is lifted, the grippers 15 and 16 engage the lower edge of the flange 20b and thereby cause the container 20a to be lifted with the handle. When the handle is being placed on or removed from the container 20a, the grippers 15 and 16 are disengaged from the flange 20b by pressing down on the projection 20. The projection 20 may readily and conveniently be depressed by the thumb of a hand grasping the handle attachment 19.

The form of my invention shown in Figure 5 operates in substantially the same way as the form of my handle shown in Figures 1-4, but its two principal structural elements comprise a curved element 21 of resilient steel to form the arched structure of the handle, and a straight element 22 of stiff and inflexible steel to form the projection which controls the arched structure of the handle. One end of the element 22 is rigidly fastened to the element 21 by bolts 23 and 24, and the other end of the element 22 extends tangentially above the arched structure of the element 21 to provide a projection 30. A handle attachment 29 is secured at the center of the element 21 to facilitate grasping the handle, and grippers 25 and 26 are secured at either end of the element 21 to engage the upper flange of a container. When the projection 30 is depressed by the thumb of a hand grasping the handle at 29, the handle will be flexed open as shown in dotted lines in Figure 5.

While the operation of the handle shown in Figure 5 is substantially the same as that of the handle shown in Figure 2, the handle shown in Figure 5 is easier to construct because only one of the two steel strips in the handle needs to be curved to form the arched structure of the handle. The other steel strip 22 may be cut from straight stock without further shaping or heat treatment.

Although I have illustrated and described a preferred embodiment of the invention, it will be recognized that changes in the details and arrangement disclosed may be made without departing from the spirit of the invention or the scope of the appended claims.

I claim:

1. A removable handle for a flanged container comprising spaced members engageable with opposite flanged sides of a container for lifting the container, a resilient arched structure secured to and extending between said members and adapted to be grasped in the center by hand to lift a container engaged by said members, and a relatively stiff member connected to the arched structure with a portion adjacent a central portion of the arched structure, said member being movable toward the arched structure by a hand grasping the center of the arched structure, to spread the arched structure and thereby to spread both of the spaced members out of engagement with the container while the handle is being placed on or removed from the container, and upon release of the stiff member the arched structure is adapted to spring back to narrow the spacing between the spaced members, to bring the spaced members into lifting engagement with the container when the handle is suitably held over the container, and to clamp the handle on the container when the handle is released after being put on the container.

2. A removable handle for a container comprising spaced members engageable with opposite sides of the container for lifting the container, an arched structure secured to and extending between said members and having a central portion adapted to be grasped by hand to lift a container engaged by said spaced members, and a relatively stiff member having a portion spaced away from and above a central portion of the arched structure when the handle is in lifting position, and having another portion rigidly fastened to the arched structure between one of said spaced members and said central portion of the arched structure, said arched structure being capable of resilient bending between its said central portion and where it is fastened to the relatively stiff member, whereby said relatively stiff member is movable toward the arched structure, said member being movable toward the arched structure by a hand grasping the center of the arched structure, to spread the arched structure and thereby to spread both of the spaced members out of engagement with the container while the handle is being placed on or removed from the container, and upon release of the stiff member the arched structure is adapted to spring back to narrow the spacing between the spaced members, to bring the spaced members into lifting engagement with the container when the handle is suitably held over the container, and to clamp the handle on the container when the handle is released after being put on the container.

JOHN W. GUZEL.

REFERENCES CITED

The following references are of record in the file of this patent:

UNITED STATES PATENTS

| Number | Name | Date |
| --- | --- | --- |
| 445,283 | Cleveland | Jan. 27, 1891 |
| 2,198,244 | Chapman | Apr. 23, 1940 |